United States Patent
Richardson

(10) Patent No.: US 11,232,768 B2
(45) Date of Patent: Jan. 25, 2022

(54) EMBEDDING ANIMATION IN ELECTRONIC MAIL, TEXT MESSAGES AND WEBSITES

(71) Applicant: Emailfilm Technology, Inc., Austin, TX (US)

(72) Inventor: Douglas G. Richardson, Dripping Springs, TX (US)

(73) Assignee: Douglas G. Richardson, Dripping Springs, TX (US)

( * ) Notice: Subject to any disclaimer, the term of this patent is extended or adjusted under 35 U.S.C. 154(b) by 0 days.

(21) Appl. No.: 14/262,947

(22) Filed: Apr. 28, 2014

(65) Prior Publication Data
US 2014/0253586 A1 Sep. 11, 2014

Related U.S. Application Data

(63) Continuation-in-part of application No. 13/941,589, filed on Jul. 15, 2013, now abandoned, which is a
(Continued)

(51) Int. Cl.
*G09G 5/377* (2006.01)
*G06T 13/80* (2011.01)
(Continued)

(52) U.S. Cl.
CPC ............ *G09G 5/377* (2013.01); *G06T 13/80* (2013.01); *G11B 27/034* (2013.01); *H04N 19/23* (2014.11); *H04N 19/27* (2014.11)

(58) Field of Classification Search
CPC .................................................... G06T 13/00
See application file for complete search history.

(56) References Cited

U.S. PATENT DOCUMENTS

| 1,242,674 A | 10/1917 | Fleischer |
| 4,602,286 A | 7/1986 | Kellar et al. |

(Continued)

FOREIGN PATENT DOCUMENTS

| JP | H09102910 | 4/1997 |
| JP | H10126741 | 5/1998 |

(Continued)

OTHER PUBLICATIONS

Pappas; "Notice of Allowance"; U.S. Appl. No. 11/586,016; now U.S. Pat. No. 7,388,587; dated Jun. 17, 2008.
(Continued)

*Primary Examiner* — Grace Q Li
(74) *Attorney, Agent, or Firm* — Gregory K. Goshorn; Greg Goshorn, P.C.

(57) ABSTRACT

Provided are techniques for providing animation in electronic communications. An image is generated by capturing multiple photographs from a camera or video camera. The first photograph is called the "key photo." Using a graphics program, photos subsequent to the key photo are edited to cut an element common to the subsequent photos. The cut images are pasted into the key photo as layers. The modified key photo including the layers, is stored as a web-enabled graphics file, which is then transmitted in conjunction with electronic communication. When the electronic communication is received, the key photo is displayed and each of the layers is displayed and removed in the order that each was taken with a short delay between photos. In this manner, a movie is generated with much smaller files than is currently possible.

17 Claims, 9 Drawing Sheets

Related U.S. Application Data continuation of application No. 13/232,306, filed on Sep. 14, 2011, now Pat. No. 8,487,939, which is a continuation-in-part of application No. 12/140,060, filed on Jun. 16, 2008, now Pat. No. 8,035,644, which is a continuation-in-part of application No. 11/586,016, filed on Oct. 25, 2006, now Pat. No. 7,388,587, which is a continuation-in-part of application No. 11/403,374, filed on Apr. 12, 2006, now Pat. No. 7,629,977.

(60) Provisional application No. 60/670,402, filed on Apr. 12, 2005.

(51) Int. Cl.
  *G11B 27/034* (2006.01)
  *H04N 19/23* (2014.01)
  *H04N 19/27* (2014.01)

(56) References Cited

U.S. PATENT DOCUMENTS

| | | | |
|---|---|---|---|
| 4,893,182 | A | 1/1990 | Gautraud et al. |
| 5,280,530 | A | 1/1994 | Trew et al. |
| 5,459,529 | A | 10/1995 | Searby et al. |
| 5,533,181 | A | 7/1996 | Bergsneider |
| 5,875,108 | A | 2/1999 | Hoffberg et al. |
| 5,982,350 | A | 11/1999 | Hekmatpour et al. |
| 6,026,232 | A | 2/2000 | Yogeshwar et al. |
| 6,081,278 | A | 6/2000 | Chen |
| 6,266,068 | B1 | 7/2001 | Kang et al. |
| 6,335,988 | B1 | 1/2002 | Kondo |
| 6,366,316 | B1 | 4/2002 | Parulski et al. |
| 6,466,210 | B1 | 10/2002 | Carlsen et al. |
| 6,591,006 | B1 | 7/2003 | Niemann |
| 6,636,220 | B1 | 10/2003 | Szeliski et al. |
| 6,643,641 | B1 | 11/2003 | Snyder |
| 6,714,202 | B2 | 3/2004 | Dorrell |
| 6,721,952 | B1 | 4/2004 | Guedalia et al. |
| 6,757,008 | B1 | 6/2004 | Smith |
| 6,791,695 | B2 | 9/2004 | Lindsay et al. |
| 6,798,897 | B1 | 9/2004 | Rosenberg |
| 6,801,663 | B2 | 10/2004 | Matsushita et al. |
| 6,828,973 | B2 | 12/2004 | Fery |
| 6,879,701 | B1 | 4/2005 | Rhoads |
| 6,919,892 | B1 | 7/2005 | Cheiky et al. |
| 6,928,613 | B1 | 8/2005 | Ishii et al. |
| 6,944,357 | B2 | 9/2005 | Bossut et al. |
| 6,956,573 | B1 | 10/2005 | Bergen et al. |
| 6,977,664 | B1 | 12/2005 | Jinzenji et al. |
| 7,027,645 | B2 | 4/2006 | Swift |
| 7,030,902 | B2 | 4/2006 | Jacobs |
| 7,034,833 | B2 | 4/2006 | Epshteyn |
| 7,039,245 | B1 | 5/2006 | Hamery |
| 7,265,762 | B2 | 9/2007 | Purdy |
| 7,266,616 | B1 | 9/2007 | Munshi et al. |
| 7,307,652 | B2 | 12/2007 | Broemmelsiek |
| 7,333,497 | B2 | 2/2008 | Nishiyama |
| 7,388,587 | B1 | 6/2008 | Richardson |
| 7,447,331 | B2 | 11/2008 | Brown et al. |
| 7,629,977 | B1 | 12/2009 | Richardson |
| 7,650,058 | B1 * | 1/2010 | Garoutte ......... G08B 13/19604 382/103 |
| 7,751,628 | B1 | 7/2010 | Reisman |
| 7,890,092 | B2 | 2/2011 | Bruno et al. |
| 8,243,093 | B2 * | 8/2012 | Feng ......... G09G 5/026 345/102 |
| 2001/0026277 | A1 * | 10/2001 | Dorrell ......... H04N 19/00 345/474 |
| 2002/0052891 | A1 | 5/2002 | Michaud et al. |
| 2002/0063714 | A1 | 5/2002 | Haas et al. |
| 2002/0080881 | A1 * | 6/2002 | Honda ......... H04N 19/587 375/240.16 |
| 2003/0099378 | A1 * | 5/2003 | Ide ......... G06K 9/20 382/107 |
| 2003/0128390 | A1 | 7/2003 | Yip et al. |
| 2003/0137506 | A1 | 7/2003 | Efran et al. |
| 2003/0222976 | A1 | 12/2003 | Duran et al. |
| 2004/0076216 | A1 * | 4/2004 | Chamberlain ......... G01N 25/72 374/57 |
| 2004/0130637 | A1 | 7/2004 | Kake et al. |
| 2004/0215660 | A1 * | 10/2004 | Ikeda ......... G06F 17/30277 |
| 2004/0267781 | A1 | 12/2004 | Smolgovsky et al. |
| 2005/0058318 | A1 | 3/2005 | Rhoads |
| 2005/0058431 | A1 | 3/2005 | Jia et al. |
| 2005/0066047 | A1 | 3/2005 | Miyake et al. |
| 2005/0066279 | A1 | 3/2005 | LeBarton et al. |
| 2005/0129385 | A1 | 6/2005 | Speasl et al. |
| 2005/0231513 | A1 | 10/2005 | LeBarton et al. |
| 2005/0248576 | A1 | 11/2005 | Chen |
| 2006/0013454 | A1 | 1/2006 | Flewelling et al. |
| 2006/0044582 | A1 | 3/2006 | Seaman et al. |
| 2006/0048056 | A1 | 3/2006 | Huang |
| 2006/0098029 | A1 * | 5/2006 | Clas ......... G06T 15/503 345/629 |
| 2006/0130636 | A1 * | 6/2006 | Toledano ......... G10H 1/34 84/600 |
| 2007/0036442 | A1 | 2/2007 | Stoffer et al. |
| 2007/0124410 | A1 * | 5/2007 | Hofstetter ......... G06F 19/322 709/217 |

FOREIGN PATENT DOCUMENTS

| | | |
|---|---|---|
| JP | H11185051 | 7/1999 |
| JP | H11195042 | 7/1999 |
| JP | H11298784 | 10/1999 |
| JP | H10302077 | 11/1999 |
| JP | 2000-067259 | 3/2000 |
| JP | 2000-092437 | 3/2000 |
| JP | 2000-348185 | 12/2000 |
| JP | 2001-245269 | 9/2001 |
| JP | 2002-135721 | 10/2002 |
| JP | 2002-290831 | 10/2002 |
| JP | 2003-289505 | 1/2003 |
| JP | 2003-037808 | 2/2003 |
| JP | 2003-043309 | 3/2003 |
| JP | 2003-143257 | 3/2003 |
| JP | 2003-141505 | 5/2003 |
| JP | 2003-204537 | 7/2003 |
| JP | 2004-032105 | 1/2004 |
| JP | 2004-032592 | 1/2004 |
| JP | H11331693 | 1/2004 |
| JP | 2004-070685 | 3/2004 |
| JP | 2004-134891 | 4/2004 |
| JP | 2004-186994 | 7/2004 |
| JP | 2004-214951 | 7/2004 |
| JP | 2004-222124 | 8/2004 |
| JP | 2004-229103 | 8/2004 |
| JP | 2004-241834 | 8/2004 |
| JP | 2004-302537 | 10/2004 |
| KR | 2004-0096001 | 11/2004 |

OTHER PUBLICATIONS

Shade et al.; "Layered Depth Images"; Siggraph 98, Orlando Florida, Jul. 19-24, 1998; Computer Graphics Proceedings, Annual Conference, 1998, pp. 231-242.

Freeman et al; "Motion Without Movement"; Computer Graphics, V. 25, No. 4, Jul. 1991; pp. 27-30.

Schodl et al.; "Video Textures"; Siggraph 2000, New Orleans, LA; pp. 489-498.

Chuang et al.; "Animnating pictures with Stochastic Motion Textures"; ,http://grail.cs.washington.edu/projects/StochasticMotionTextures/; Jul. 2005; pp. 1-8.

Sun et al.; "Video Input Driven Animation (VIDA)"; Proceedings of Ninth IEEE International Conferences on Computer Vision (ICCV'03); 2003; pp. 1-8.

Wallace; "Merging and Transformation of Raster Images for Cartoon Animation"; Program of Computer Graphics, Cornell University; V. 15, No. 3; Aug. 1981; pp. 253-262.

(56) References Cited

OTHER PUBLICATIONS

Bhat et al.; "flow-Based Video Synthesis and Editing"; ACM; 2004; pp. 360-363.
Stone; "Compressor H.264 movies from FCP for the web"; Ken Stone's Final Cut Pro Web site; Sep. 8, 2008.
Apostolopoulos, "Video Compression: Principles, Practice, and Standards"; Streaming Media Systems Group, HO Labs, Palo Alto, CA; Sep. 27, 2005.
Sethuraman; "Tutorial: The H.264 Advanced Video Compression Standard"; Ittian Systems (Pvt.) Ltd., Bangalore IEEE Multimedia Compression Workshop; Oct. 27, 2005.
Adobe Systems, Inc., Adobe Photoshop 6.0 Users Guide, copyrighted 2000, pp. 1-214.
Adobe Systems, Inc., Adobe Photoshop 6.0 Users Guide, copyrighted 2000, pp. 215-435.
Elgammal et al., "Background and Foreground Modeling Using Nonparametric Kernel Density Estimation for Visual Surveillance," Proceedings of the IEEE, V. 90, No. 7, Jul. 2002, pp. 1151-1163.
Compuserve Inc., "GIF Movie Gear: Get you Animation in Gear; Support Tutorial," pp. 1-12, copyright 1997-2015.
Compuserve Inc., "GIF Movie Gear: Get you Animation in Gear; Product: Version History," pp. 1-6, copyright 1997-2015.
Yagi et al.; "An Imaging System to Visualize Gymnast's Form and Locus—Multi-Motion," SMPTE Journal, Jun. 1998, pp. 353-357.
Compuserve Inc., Graphics Interchange Format, Version 89a, copyrighted 1987, 1988, 1990, pp. 1-39.

\* cited by examiner

EMBEDDING ANIMATION IN ELECTRONIC MAIL, TEXT MESSAGES AND WEBSITES

CROSS-REFERENCE TO RELATED APPLICATIONS

The present application is a Continuation-in-Part and claims the benefit of the filing date of the following U.S. Patent with a common inventor, which is hereby incorporated by reference:
U.S. patent application Ser. No. 13/941,589, filed Jul. 15, 2013, entitled "Embedding Animation in Electronic Mail, Text Messages and Websites;"
which is a Continuation and claims the benefit of the filing date of the following application with a common inventor, which is hereby incorporated by reference:
U.S. patent application Ser. No. 13/232,306, now U.S. Pat. No. 8,487,939, filed Sep. 14, 2011, entitled "Embedding Animation in Electronic Mail, Text Messages and Websites;"
which is a Continuation-in-Part and claims the benefit of the filing date of the following application with a common inventor which is hereby incorporated by reference:
U.S. patent application Ser. No. 12/140,060, now U.S. Pat. No. 8,035,644, filed Jun. 16, 2008, entitled "Method for Embedding Animation in Electronic Mail and Websites;"
which is a Continuation-in-Part and claims the benefit of the filing date of the following application with a common inventor, which is hereby incorporated by reference:
U.S. patent application Ser. No. 11/586,016, now U.S. Pat. No. 7,388,587, filed Nov. 25, 2006, entitled "Method for Embedding Animation in Electronic Mail and Websites;"
which is a Continuation-in-Part and claims the benefit of the filing date of the following application with a common inventor, which is hereby incorporated by reference:
U.S. patent application Ser. No. 11/403,374, now U.S. Pat. No. 7,629,977, filed Apr. 12, 2006, entitled "Method for Embedding Animation in Electronic Mail and Websites;"
which is related to and claims the claims the benefit of the filing date of the following provisional application with a common inventor, which is hereby incorporated by reference:
U.S. Provisional Patent Application Ser. No. 60/670,402, filed Apr. 12, 2005, titled "Email/Electronic Mail Embedded With Animation."

TECHNICAL FIELD

The present invention relates generally to electronic mail and websites and, more specifically, to techniques for embedding images in email, text messages and websites.

BACKGROUND OF THE INVENTION

For the past couple of decades, the amount of electronic communication has grown exponentially every year. Information content associated with the Internet, or websites, now number in the millions and, as the Internet has become increasingly accessible to millions of people, the number of email messages exchanged has also increased. Websites and email are now a common medium for the communication of both personal and business information.

People who market products or services over electronic communication channels often desire to include graphics into their presentations. Although graphics are very effective at capturing the attention of the person receiving the communication, they also require large files that must be stored and transmitted. Over a slow connection, a large file typically takes a proportionally longer time to transmit than a small file. If the transmission time is too long the person receiving the transmission may choose to abort the message.

Currently, there are several techniques for avoiding long transmission times associated with the sending of graphic information. One technique is to send static pictures, i.e. pictures that do not change. However, multiple images composed into "movies" or "animations" are better at attracting a recipient's attention. Of course, multiple images take considerably longer to transmit than a single image.

Movies are typically transmitted as a series of frames, with each frame a picture of the entire shot at successive intervals of time. Of course, each picture in a succession of shots takes time to download. Another technique for generating, movies in electronic communication is the use of flash graphics, or flash. Flash images include an image file and programming code to animate the file. In other words, rather than sending multiple images to achieve a movie affect, flash transmits one image and computer instructions on how to manipulate the image. The computer that receives the flash content then displays the image and executes the instructions to display a dynamic image. Although, this technique saves transmission bandwidth, the programming of the instructions is difficult and the results are limited to that which can be expressed in the transmitted code. In addition, the receiving computer must include a specific program, or plug-in, for executing the flash code.

Increasingly, electronic communication is performed over wireless communication channels. On wireless communication channels, the amount of information able to be transmitted in a short period of time is even more limited than on wired connections.

What is needed is an efficient technique for transmitting dynamic images over wireless, and wired, connections using a minimum or bandwidth. In other words, a new technique should be able to transmit dynamic images in small files such as email messages so that download times are minimized. What is also needed is a technique for electronically transmitting dynamic images, which is simpler in construction, more universally usable and more versatile than current techniques.

SUMMARY

Provided is a technique for embedding animation in electronic communications that is not apparent, obvious or suggested either directly or indirectly by the prior art. The claimed subject matter provides an efficient technique for transmitting dynamic images, or "movies," over both wired and wireless electronic communication media.

An image is generated by capturing multiple photographs from a camera or video camera, typically fixed at one position and focal length or held by hand or tripod with slight or large motion of the camera while filming. The first photograph is called the "key photo." Using a graphics program such as, but not limited to, Adobe Photoshop, published by Adobe Systems incorporated of San Jose, Calif., photos subsequent to the key photo are edited to select an element that is in motion. Typically, the moving element is not included in the key photo but may be. For example, the subsequent photos, but not the key photo, may include an automobile that is moving across the field of vision. If subsequent action is limited to a particular area of the photo, the object performing the action may be included in the key photo without distracting, from the desired effects.

Subsequent photos are edited to save the moving vehicle and, if necessary, a small area around the moving vehicle. This small area may then be either partially or completely removed once the chosen area is edited and pasted onto the key photo. In addition, the small area, which may, for example, vary from one (1) to (20) pixels, but may be more, may be used as a "bleed area"

In addition, depending upon a defined sensitivity level, other moving portions of the photos are edited. The edited images are stored in conjunction with the key photos as layers in a graphic file that is then web-enabled, with each layer placed in a position corresponding to the clipped image's location in the corresponding subsequent photo. IN other words, The modified key photo is then transmitted in conjunction with a web-enabled electronic communication such as an email, text message or website. When received, i.e. the email or text message is opened or the website is downloaded, the key photo is displayed. Each of the subsequent added layers is then displayed and removed in the order that each was pasted and flattened into and onto the key photo to create multiple frames of display. The layers are displayed and flattened on the key photo with a short delay in between and at a location corresponding to the location from which the layer was clipped from each photo after the key photo or the entire photo/video clip until completed or until a new key photo is detected. In this manner, a movie is generated with much smaller files than is currently possible in the prior art.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to electronic email and websites, the claimed subject matter can be implemented in any information technology (IT) system in which the efficient transmission of dynamic images is desirable. Those with skill in the computing arts will recognize that the disclosed embodiments have relevance to a wide variety of computing environments in addition to those described below. In addition, the techniques of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or main frame.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program far use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 1:
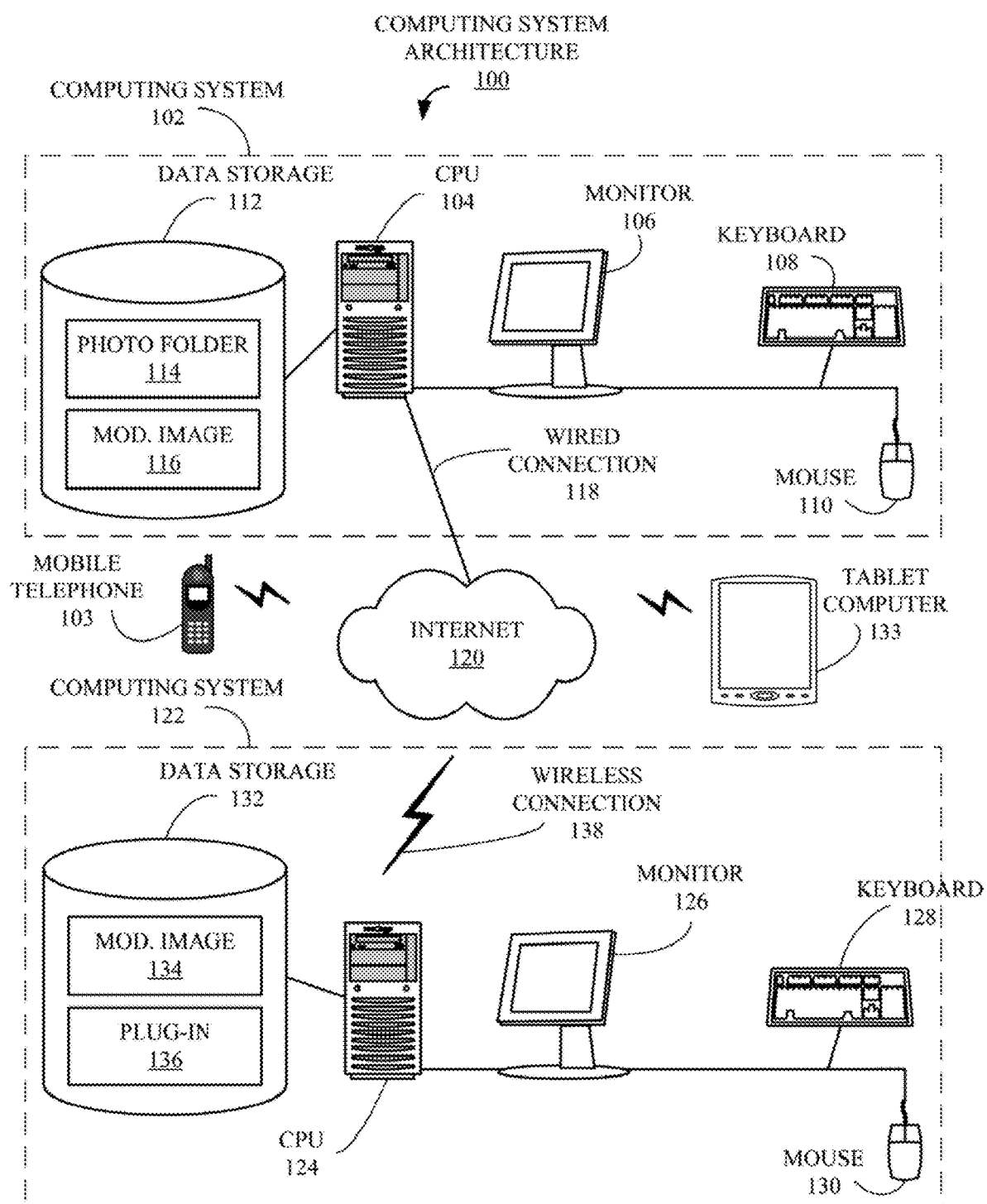
FIG. 1 is a block diagram of an exemplary computing system architecture that supports the claimed subject matter.

Turning now to the figures, FIG. 1 is a block diagram of an exemplary computing system architecture 100 that supports the claimed subject matter. It should be noted there are many possible computing system architecture configurations, of which computing system architecture 100 is only one simple example.

A computing system, or computer, 102 includes a central processing unit (CPU) 104, coupled to a monitor 106, a keyboard 108 and a mouse 110, which together facilitate human interaction with computer 102. Also included in computer 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown).

A computer readable storage medium, or data storage, 112 is illustrated storing an exemplary photography file, or photo folder, 114. Photo folder 114, which includes captured images 151-158 (see FIG. 2), is employed in one exemplary implementation of the claimed subject, explained below in conjunction with FIGS. 2-6. A modified (mod.) image file 116, which may store multiple images, is stored on data storage 112. Mod. image file 116 stores a digital image or images, composed of other images such as image 151 and portions of images 192-198 (see FIG. 3). Mod. Image file 116 is created and organized according to an Animation Setup process 300 described in more detail below in conjunction with FIG. 5. In an alternative embodiment, rather than one image file 116, there are multiple files. In other words rather than a single image file 116, there is modified image file 116, which is a high resolution graphic format such as, but not limited to, a joint photographic experts group (jpg) format that holds a key image (see element 151, FIGS. 2 and 3) and there is another file of lower resolution graphic format, such as but not limited to graphics interchange format (gif), portable network graphics (PNG) format and animated portable network graphics (APNG) format, that stores multiple images that are portions of images 192-198, employed to add animation to the key image (see elements 172-178, FIGS. 2 and 3) stored in image file 116 as described below.

Computer 102 is connected to the Internet 120 via a wired connection 118. Although in this example, computer 102 is communicatively coupled to the Internet 120 via wired connection 118, it could also be coupled through any number of communication mediums such as, but not limited to, a local area network (LAN) (not shown) and a wireless connection.

Also attached to Internet 120 is a second computing system, or computer, 122, which like computer 102 includes a CPU 124, a monitor 126, a keyboard 128, a mouse 130 and data storage 132. Data storage 132 is illustrated storing an exemplary modified (mod.) image file 134 and an executable module, or plug-in, 136. Modified image 134 is a copy of modified image 116, which has been transmitted from computer 102 to computer 122. The transmission of file 116 may be in conjunction with, for example but not limited to, an email message or the downloading of a web page. Plug-in module 136 is a piece of computer logic that might execute typical animations. In contrast, the claimed subject matter, as illustrated in a Display Animation process 330, described below in conjunction with FIG. 6, does not need plug-in module 136 to execute.

Computer 122 is coupled to the Internet 120 via a wireless connection 138. Although in this example, computer 122 is communicatively coupled to the Internet 120 via wireless connection 138, it could also be coupled through any number of communication mediums such as, but not limited to, a local area network (LAN) (not shown) and a wired connection such as connection 118. Connections 118 and 138 via Internet 120 enable computer 102 and computer 122 to communicate. In the following example, the claimed subject matter is described with respect to an electronic mail message, or email, (not shown), text messages or a web page (not shown) transmitted from computer 102 to computer 122 via Internet 120.

The disclosed technology is also applicable to other types of computing devices, both wired and wireless, that may send and receive email, text messages, web pages or images such as, but not limited to, a mobile telephone 103, a tablet computer 133 and a pad computer (not shown). In mobile text messaging, such as multimedia service (MMS), the claimed technology may display one or more movie-like images when a text message is opened on a first mobile device without requiring a "play" command to be executed. For example, images produced by a second mobile device may be processed in accordance with the claimed subject matter by an application on the second mobile device, transmitted to the first mobile device and displayed on the first mobile device in an "auto-play" mode. In addition, images may be captured in a typical movie fashion and automatically processed by an embedded application on the mobile device that captures the images to produce a file in accordance with the claimed subject matter.

Figure 2:
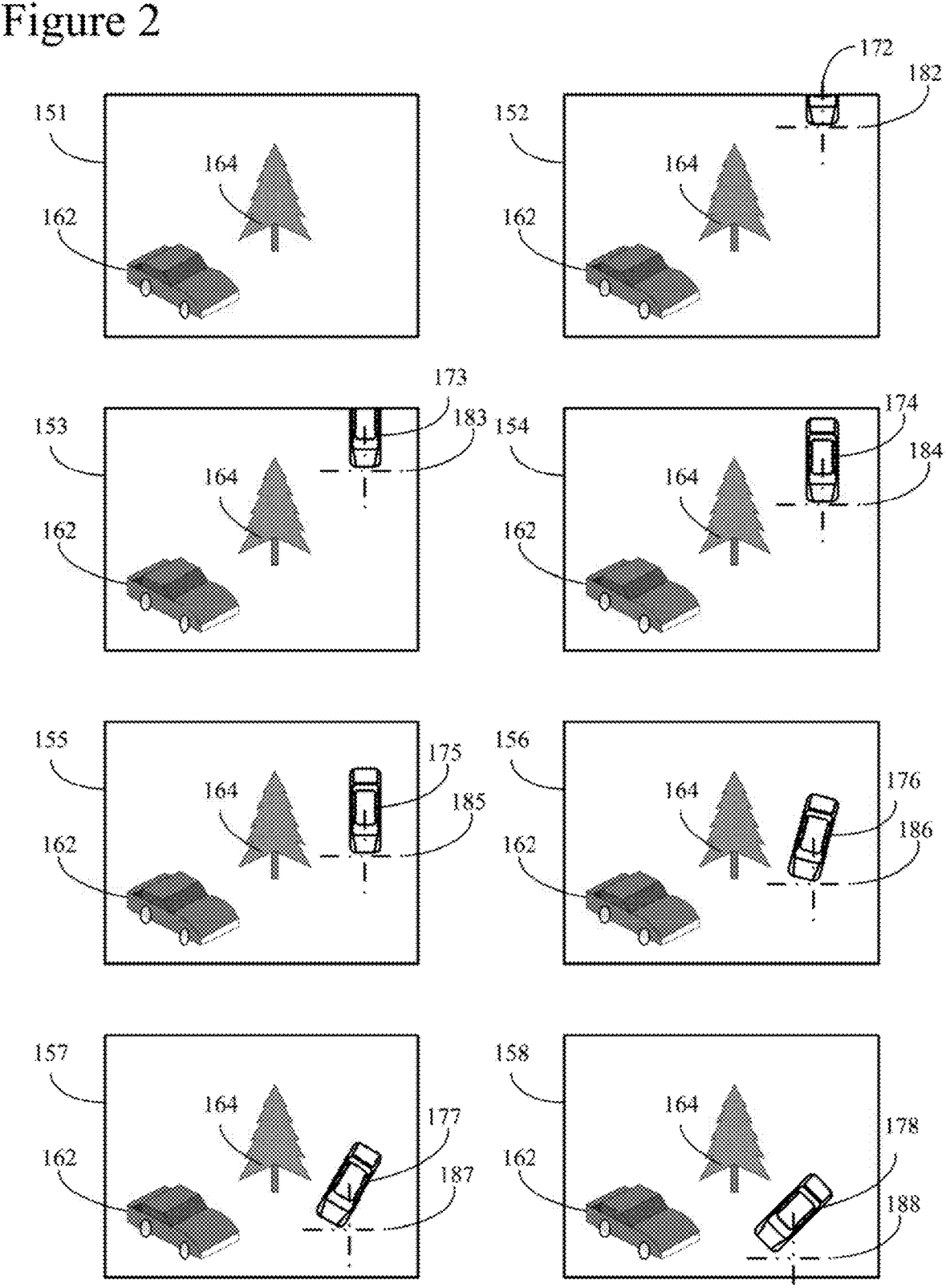
FIG. 2 is an illustration of eight photographs of a particular scene, captured one after the other with a short time delay.

FIG. 2 is an illustration of eight photographs, or images, 151-158 of a particular scene, captured one after the other with a short time delay. Examples of equipment for taking photographs 151-158 include, but are not limited to, a video camera, a 35 mm camera, a medium or large format digital or film camera, and a mobile device, such as mobile telephone 103 (FIG. 1) and pad computer 133 (FIG. 1). Photographs also may include inserted graphic enhancements and/or text. Images 151-158 are for example only and are used in conjunction with FIGS. 5-8 to describe the claimed subject matter. In this example, images 151-158 are stored in photo folder 114 (FIG. 1) of data storage 112 (FIG. 1).

A first image 151 includes two exemplary elements, an automobile 162 and a tree 164. A second image 152 is captured a short time after first image 151 and also includes automobile 162 and tree 164. Image 152 also includes a partial shot of a second automobile 172 that is in motion and beginning to enter frame 152. Automobile 172 is illustrated at a position 182 within image 152. Although displayed from different perspectives and at different locations within images 152-158, the second automobile is referred to throughout the Specification as automobile 172. It should be noted that automobile 172 is only one example of the type of image that may be animated according to the claimed subject matter. Another example includes, but is not limited to, text images.

In a similar fashion, each of third, fourth, fifth, sixth, seventh and eighth images 153-158 include exemplary automobile 162 and tree 164. Each of images 153-158 also shows images of automobile 172 from slightly different perspectives 173-178 and positions 183-188, respectively, within frames 153-158. Different positions 183-188 result from a short delay in time between the capture of images 152-158 such that automobile 172, which is in motion, has changed perspective and moved between capture of images 152-158.

Figure 3:
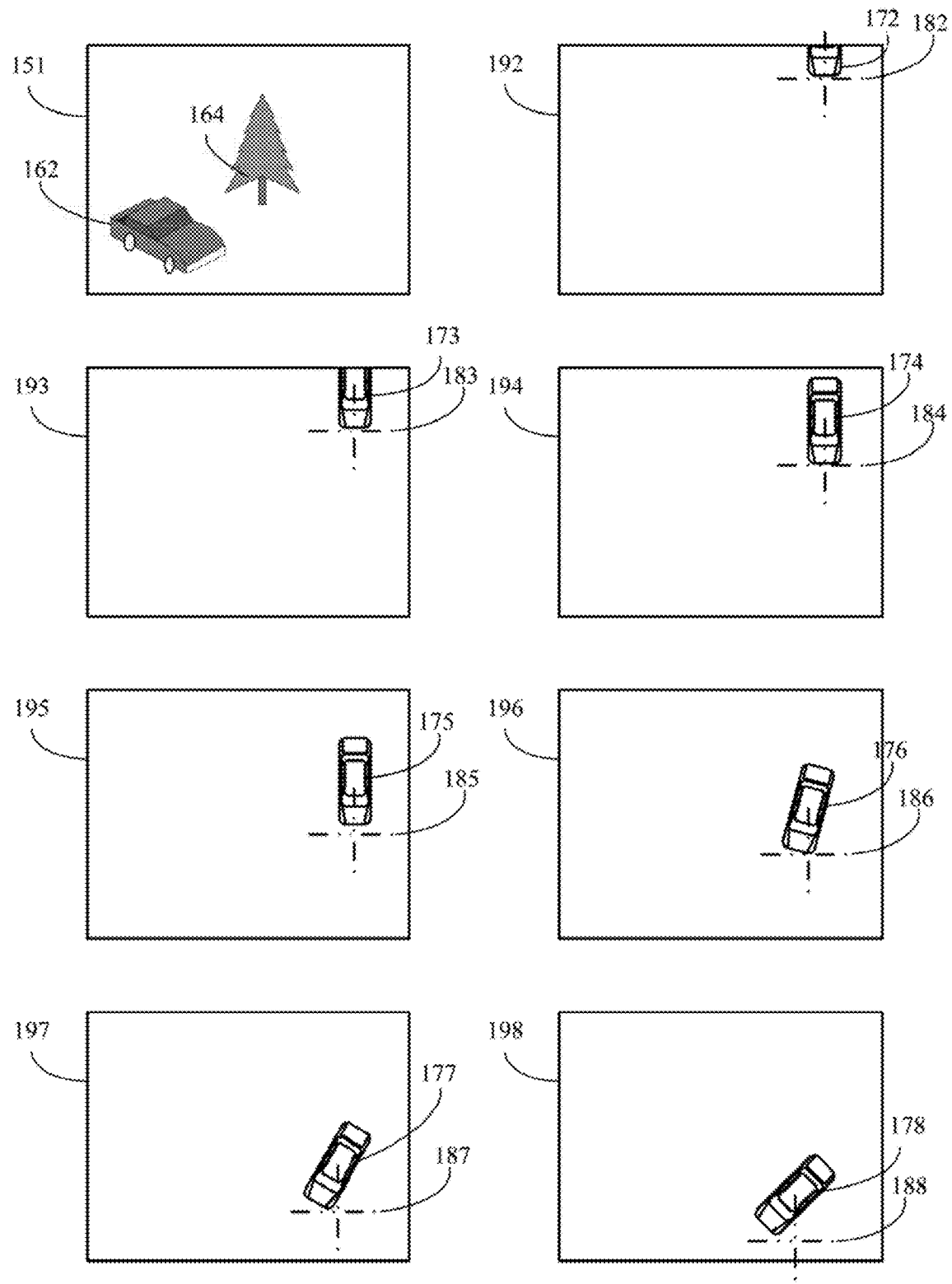
FIG. 3 is an illustration of the eight photographs of FIG. 2 after modification in accordance with one implementation of the claimed subject matter.

FIG. 3 is an illustration of eight images, specifically image 151 (FIG. 2) and images 192-198. Image 151 is the same as image 151 of FIG. 2, including automobile 162 (FIG. 2) and tree 164 (FIG. 2). Images 192-198 correspond to images 152-158 of FIG. 2 after modification in accordance with the claimed subject matter. The modification of images 152-158 to produce images 192-198 is described in more detail below in conjunction with FIG. 5. The use of images 151 and 192-198 to produce an animation, or "movie," in accordance with the claimed subject matter is explained in detail below in conjunction with FIG. 6. Those with skill in the animation and computing arts should understand how multiple images are composed to create an animation or movie in which movement of elements is created. In this example, images 151 and 192-198 are stored in modified image file 116 (FIG. 1) of data storage 112 (FIG. 1).

As mentioned above, image 151 is the first image captured in the series of images 151-158 and is referred to as the "key image" Images 192-198 include frames the size of key image 151 and a selected element, which in this example is automobile 172 (FIG. 2) from images 152-158. Clipped portions of images 152-158 that include different perspectives 172-178 of second automobile 172 are positioned in the corresponding frames 192-198 in the same position 182-188 (FIG. 2) as in the corresponding images 152-158. In this example, the entire frames 192-198 and the selected elements 172-178, representing the second automobile 172 are stored as layers in modified image 116. The entire frames 192-198, with the exception of elements 172-178 are transparent so that, as layers of image 151, the features of frame 151 such as automobile 162 and tree 164 are displayed without the need to retransmit the corresponding information with each frame 192-198. In alternative embodiment, only elements 172-178 and corresponding positions 182-188 are stored and/or may be stored at in a lower resolution format.

Figure 4:
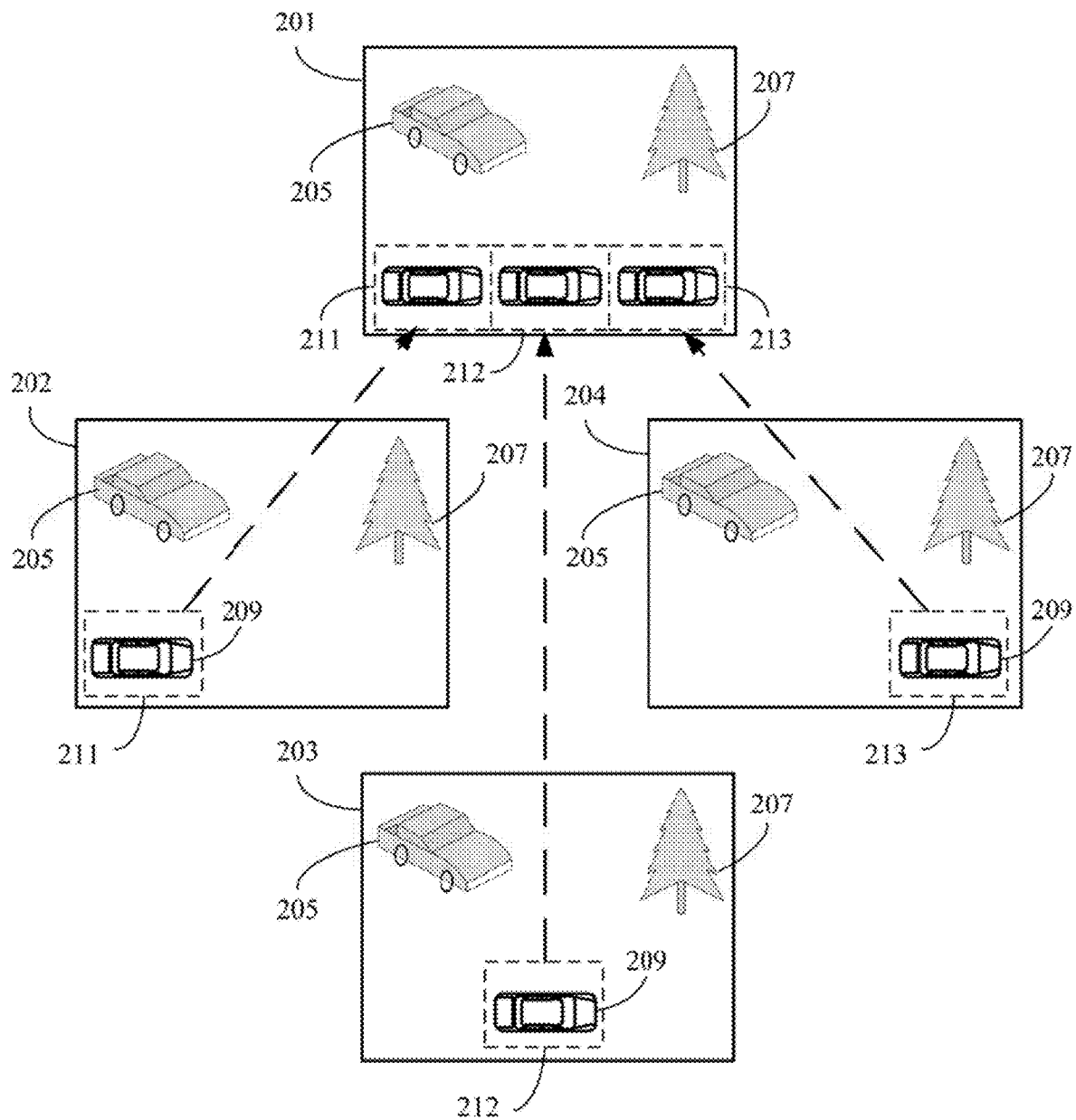
FIG. 4 is an illustration of four photographs showing a portion of some of the photographs superimposed upon the first photograph in accordance with a second implementation of the claimed subject matter.

FIG. 4 is an illustration of four photographs, or images, 201-204, taken sequentially, each of which include an automobile 205 and a tree 207. Photographs 202-203 include a picture of a second automobile 209. When photograph 201 is captured, second automobile 209 is not in photograph 201. As described in more detail below in conjunction with FIG. 5, a portion 211 of image 202, which includes automobile 209, is cut and pasted into image 201 as a layer superimposed upon image 201. A portion 212 and a portion 213 of images 203 and 204, also including automobile 209, respectively, are also cut and pasted into image 201 as two additional and separate layers. It should be noted that to create the appearance of movement of automobile 209 within modified image 201, typically more than three (3) photographs, with the selected elements overlapping, are taken. For the sake of simplicity, only three (3) images are shown.

Figure 5:
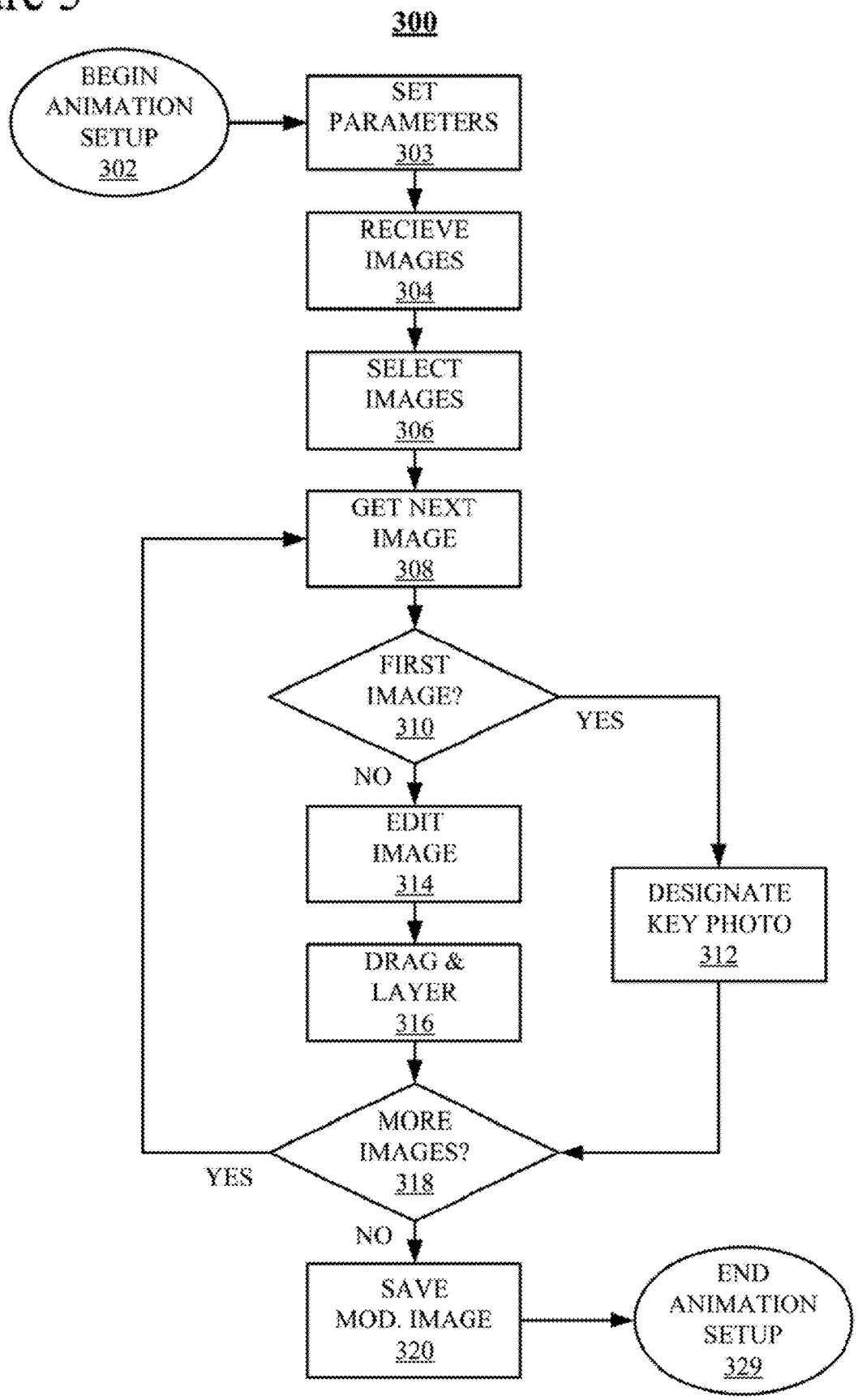
FIG. 5 is a flowchart of an exemplary Animation Setup process that implements the claimed subject matter.

FIG. 5 is a flowchart of an exemplary Animation Setup 300 process that creates one implementation of the claimed subject matter. In this example, logic associated with process 300 is executed on CPU 104 (FIG. 1) by a user using devices 106, 108 and 110 (FIG. 1) of computer 102 (FIG. 1). Throughout the description of process 300 and a Display Animation process 330, described, below in conjunction with FIG. 6, both captured images 151-158 (FIG. 2) and modified images 192-198 (FIG. 3) represent a scene of automobile 172 (FIGS. 2 and 3) driving across the field of view and stopping in the forefront of the resulting frame. Processes 300 and 330 are described in relation to images 151-158 and images 192-198. In addition, when appropriate for the understanding of an alternative embodiment, process 300 is described in relation to images 201-204 and frames 211-213 of FIG. 4. These particular scenes are used only as examples and it should be understood that the claimed subject matter is equally applicable to many different types of images in which movement of a specific element or elements, the "target" element(s), is desired. Further, more than one element may be targeted and implemented within a single animation or movie.

Process 300 starts in a "Begin Animation Setup" block 302 and proceeds immediately to a "Set Parameters" block 303. During processing associated with block 303, process 300 incorporates various setup parameters that control image processing. One example of a setup parameter is a value that adjusts the sensitivity of the processing of photos. For example, at a low sensitivity setting, only large blocks of pixels that change from frame to frame, such as the pixels corresponding to automobile 172 (FIGS. 3 and 4, are included in the image processing, for inclusion in a finished product. At a high sensitivity setting, blocks of pixels of small objects, such as leaves (not shown) on tree 164 (FIGS. 3 and 4), are processed as well. The sensitivity level includes, but is not limited to, parameters for specifying both the size of pixel blocks that are compared, i.e. the granularity, the degree of difference in compared pixel blocks that are considered significant and a calculation of a degree of movement corresponding to an identified portion. Those with skill in the computing and graphics arts should be familiar with techniques for implementing this aspect of the claimed subject matter.

In addition, a second sensitivity parameter may be set to control a transition to a new animation. In other words, depending upon differences between two images, either between a received image and an immediately previous image or between the received image and a corresponding key frame, the claimed subject matter enables a series of images to be saved as one movie or animation and a second or more series of images, including one or more new key frames, to be initiated as a second or more movie or animation. All animations may be saved as to single image file. Examples of the types of differences that may be detected between images include, but are not limited to, the amount or percent of changed pixel, color or a combination. Use of the second sensitivity parameter is described in more detail below in conjunction with FIG. 8.

During processing associated with a "Capture Images" block 304, a camera, mobile computing device or video camera is employed to take a number of pictures or images. In some embodiments, frame stabilization techniques may be applied to images as they are captured. Further, frames may be processed by reducing the number of colors, such as reducing an image with 256 colors to 128, 64, and so on colors. One with skill in the relevant arts should be familiar with both stabilization and color reducing techniques. In the following example, mobile telephone 103 (FIG. 1) captures images 151-158, which together capture movement of automobile 172 at successive points in travel through the scene. In the alternative, images 211-204 are captured. Unless the embodiment associated with images 201-204 differs from the embodiment associated with FIGS. 3 and 4, the following example employs images 151-158.

Any number of images may be captured, but typically the number is between two (2) and live hundred (500) with a delay between images of 0.01 to 1.0 seconds. It should also be noted that the time interval between the capture of images and the "playback" of the images may be different. For example, if images are captured every 0.05 seconds, or 20 fps, the payback may be adjusted so that the playback may be lengthened, e.g. 10 fps, or shortened, e.g 30 fps, to take place in a defined time period. During processing associated with a "Select Images" block 306, particular images of images 151-158, captured during processing associated with block 304, are selected for further processing. Although in the following example all of images 151-158 are selected, a subset of the total number of images may be selected for further processing, e.g. every second or third image. In addition, processing may begin with the image in the middle of a succession of images. Throughout the Specification, the selected image is referred to as the "first" image, implying the first image selected and processed in accordance with the disclosed technology.

During processing associated with a "Get Next Image" block 308, process 300 retrieves from photo folder 114 (FIG. 1) of data storage 112 (FIG. 1) the first unprocessed image 151-158, based upon chronological order. During processing associated with a "First Image?" block 310, process 300 determines whether or not the image retrieved during block 308 is the first chosen image in the sequence of images 151-158. It should be understood that the "first" image may not be the first image in any particular file, i.e., a user may select any image in a particular file to be designated the "first" image. In other words, the first image is simply the first image chosen in a sequence of images to which the claimed subject matter is to be applied. In this example, during the first iteration through block 308, the retrieved image is image 151, which does happen to be the first image. In that case, process 300 proceeds to a "Designate Key Photo" block 312 during which image 151 is designated as the "key Photo" and stored in modified image file 116 (FIG. 1) of data storage 112. In one embodiment, image file 116 is a high resolution graphic file, such as but not limited to, a jpg file and subsequent images are stored in a different lower resolution format file (not shown).

If the image retrieved during block 308 is not the first image in the series of images 151-158, process 300 proceeds to an "Edit Image" block 314. During processing associated with block 314, process 300 as directed by the user, selects an element of the image retrieved during block 308, e.g. image 152. In this example, the targeted element is automobile 172 and the portion of image 152 associated with automobile 172 is clipped from image 151. In an alternative embodiment associated with FIG. 4, the image retrieved during processing associated, with block 208 is image 202 and the target element is automobile 209. Element 209 and an area adjacent to element 209 are clipped from image 202. In addition to selecting an area as small as possible, a "bleed" area may be selected. A bleed area, is an expanded area around element 209, typically a width of between one (1) and twenty (20) pixels but may be more. Bock 314 is describes in more detail below in conjunction with FIG. 7.

During processing associated with a "Drag & Layer" block 316, process 300 places the image clipped during block 314 into frame 192 (FIG. 3), which is the same size as key photo 151. Automobile 172 is also positioned within frame 192 in a position corresponding to the position of automobile 172 in corresponding image 152, which in this iteration is position 182 (FIGS. 2 and 3). Then, process 300 stores modified image 192 in modified images file 116 as a layer of key picture 151. In the alternative embodiment associated with FIG. 4, a clipped image 211 with the targeted element is stored as a layer of key photo 201 in a position corresponding to the location of element 211 in corresponding captured image 202, rather than storing the clipped image with a frame. In another embodiment, the clipped image is stored in conjunction with coordinates corresponding to the location of the image from which the image was clipped, rather than in a frame. In addition, clipped images may be stored at a lower resolution than the key image. The layer is then stored in key image 151 at a position corresponding to the stored coordinates or stored in the lower format in a different file, along with the corresponding coordinates.

During processing associated with a "More Images?" block 318, process 300 determines whether or not there are additional unprocessed images in image file 114. If so, process 300 returns to Get Next Image block 308 and processing continues as described above. If not, process 300 proceeds to a "Save Mod. Image" block 320 during processing associated with which the key photo, along with the layers generated during iterations through blocks 308, 310, 314, 316 and 318, are stored as mod. image file 116 in a web compatible graphic format such as, but not limited to, a graphic interchange format (gif), a joint photographic experts group (jpg) format, a portable network Graphics (PNG) format and an animated portable network graphics (APNG) format. When the image is received as part of an electronic communication, a web browser application automatically knows how to display the image to reveal the claimed subject matter but, when a user attempts to save the image, the web browser typically only offers to save as a file that captures a snapshot rather than the animated aspects of the image. In other words, the web browser save option captures a snapshot of image 116 at a particular point in time but does not preserve the disclosed animation qualities of the image.

In an alternative embodiment, an image that is not one of sequence of images 151-158 may be selected as the key photo during processing associated with block 312. In this manner, the portions of the images 151-158 that are selected during processing associated with blocks 314 and 318 are inserted into an image that is not part of the particular sequence of images 151-158 and which may be a completely unrelated image or an image not in the particular sequence but taken at the same location. For example, in one example, frames numbered one through one hundred (1-100) are captured; frame, number 10 is selected as the key image; portions of images 50-75 are edited to identify a portion; and the portions of images 50-75 are layered onto frame number 10. In addition, multiple areas may be selected and layered onto an image. For example, after processing images through blocks 308, 310, 314, 316 and 318, images 151-158 may be reprocessed to identify and select a different portion of images 151-158, in addition to the original portions, to be displayed in accordance with the disclosed technology. Further, the key image may be saved in a different format than the other images. For example, the key image may be saved in a .jpg format while the other images that are "played on top" of the key image are .gif format.

The graphic file is then embedded in a web-based format, such as but not limited to, hypertext markup language (html) file, to make the file web-enabled. Those with skill in the computing arts should be familiar with various graphic and web-enabling formats for images such as gif, jpeg and html. It should be noted that a web-enabled file generated in accordance with the disclosed techniques would be particularly useful in conjunction with online stores, internet auction sites and e-commerce sites such as, but not limited to, Craig's List and Ebay. Finally, process 300 proceeds to an "End Animation Setup" block 319 in which process 300 is complete.

Although not illustrated, a graphical user interface (GUI) may be provided to facilitate the execution of many of the actions represented in process 300. For example, the selection of a key image from a number of images, the identification of an area within successive images and even the placement of the cut images within the key image may all be performed by a user using a graphical user interface.

Figure 6:
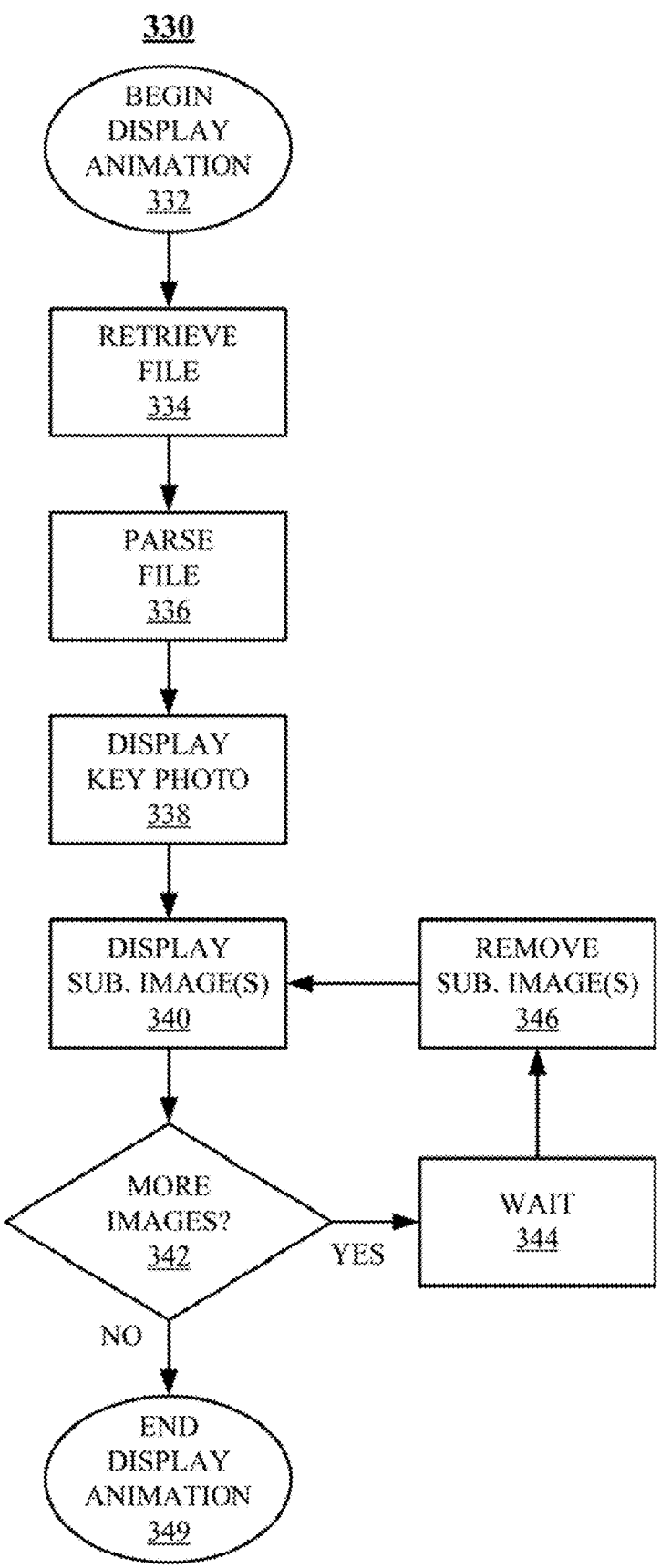
FIG. 6 is a flowchart of an exemplary Display Animation process that implements the claimed subject matter.

FIG. 6 is a flowchart of an exemplary Display Animation process 330 that implements the claimed subject matter. In this example, logic associated with process 330 is executed on CPU 124 (FIG. 1) of computing system 122 (FIG. 1). Process 330 starts in a "Begin Display Animation" block 332 and proceeds immediately to a "Retrieve File" block 334. During processing associated with block 334, process 330 retrieves modified image file 134 (FIG. 1). As mentioned above in conjunction with FIG. 1, modified image 134 is a copy of modified images 116 (FIG. 1), which have been transmitted from computer 102 (FIG. 1) to computer 122. The transmission of file 116 may be in conjunction with, for example but not limited to, an email message or the downloading of a web page. In another embodiment, multiple files rather than one file are retrieved, with one file of a higher resolution that the other file or files.

During processing associated with a "Parse File" block 336, process 330 separates modified image 134 into component parts, or images 151 and frames, or layers, 192-198, for display on monitor 126 (FIG. 1). During processing associated with a "Display Key Photo" block 338, process displays key image 151 on monitor 126. Key photo 151 may be displayed while layers 192-198 are in the process of being downloaded or parsed. In this manner, a first image can be displayed quickly while processing related to subsequent images is executed. As explained above in conjunction with FIG. 1, in one embodiment, key image 151 may be stored in a higher resolution format file than file or files employed to store layers 192-198.

During processing associated with a "Display Subsequent (Sub.) Image(s)" block 340, process 330 selects an image of images 192-198 that is the first image in chronological order among the images of images 192-198 that have not yet been processed. The selected image 192-198 is then superimposed upon key image 151. It should be understood that there may be multiple sets of sub-images superimposed on a particular key image. In other words, multiple areas within key frame 151 may be selected, processed and superimposed on a single key frame in accordance with the claimed subject matter.

In addition, portions of process 330 may be repeated. For example, once a determination is made during processing associated with block 342 that all the images 192-198 have been displayed, the final image may be removed and the process repeated staring with the first image in a loop. Techniques may then be employed to "smooth" the transition from the last image to the last image to present a more natural looking movement. For example, a first transition may involve a fade-out of the last image and a fade-in of the first image that follows. In another transition, sub-images may be displayed and removed in a reverse order, i.e., image 198, followed by image 197 and so on. Once images 192-198 have been displayed in reverse order, they may then be repeated in regular order and so on. A third type of transition involves detecting two of images 192-198 are similar and displaying and removing image only within a particular range. For example, a determination may be may that image 193 and 197 are very similar and, therefore, a resulting animation that repeats using only images 193-197 would have a smoother look, i.e., a less obvious transition from the end of the animation to the beginning of a repeat. It should be understood that possible techniques for smoothing, transitions are not limited to the three examples.

During processing associated with a "More Images?" block 342, process 330 determines whether or not all the images 192-198 have been displayed. If not, process 330 proceeds to a "Wait" block 344 during processing associated with which a small interval of time is allowed to pass. The amount of elapsed time is typically equivalent to the period of time between two successive image captures performed during Capture Images block 304 (FIG. 5) of process 300 (FIG. 5). This amount of elapsed time enables the resultant animation to appear to unfold in real-time. Of course the animation may be seed up or slowed down by either shortening or lengthening, respectively, the time delay introduced during block 344. During a "Remove Sub. Image(s)" block 346, process 330 removes the image 192-198 or images displayed during block 340 and process 330 returns to block 340 during processing associated with which processing continues as described above.

If during processing associated with block 342 process 330 determines that all of images 192-198 have been displayed, control proceeds to an "End Display Animation" block 349 in which process 330 is complete. It should be noted that following the display of the last of images 192-198 control does not in this example return to block 346, during processing associated with which the displayed image is removed from key photo 151, thereby leaving the last photo superimposed key photo 151 on monitor 126. Of course, process 330 may also be configured to remove the last superimposed image.

In an alternative embodiment, the images displayed during processing associated with block 340 may be played in reverse order. For example, after determining during processing associated with block 342 that the last of the sub. Images has been displayed the video may be played in reverse order. In this manner, a more jump-free transition from the last image to a replay of the first image may be achieved in the event the image repeats one or more times.

Figure 7:
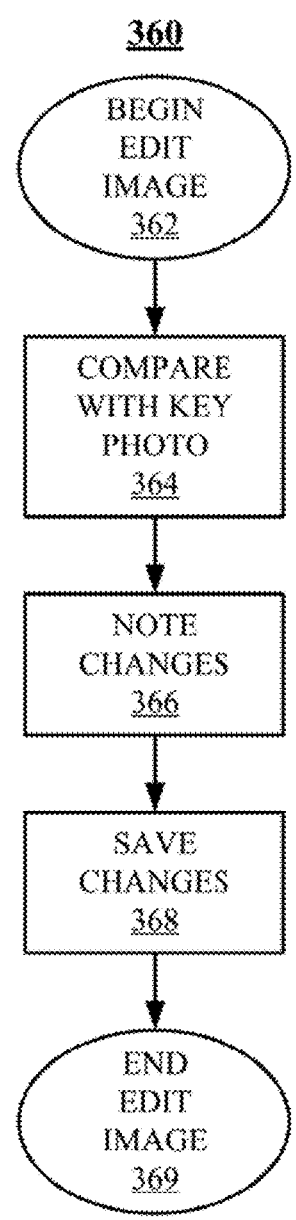
FIG. 7 is a flowchart of an Edit Image block, introduced in FIG. 5, in more detail.

FIG. 7 is a flowchart of an Edit Image process 360, corresponding to Edit Image block 214, first introduced above in conjunction with FIG. 5. Process 360 starts in a "Begin "Edit Image" block 362 and proceeds immediately to a "Compare with Key Photo" block 364. During processing associated with block 364, process 360 compares the current image with the key image captured during Capture Images block 304 (FIG. 5) of Animation Setup process 300 (FIG. 5) and designated as the key image during Designate Key Photo block 312 (FIG. 5) of process 300. The comparison is based upon a degree of sensitivity defined during Set Parameters block 303 (FIG. 5) of process 300. For example, as explained above in conjunction with FIG. 5, at a low sensitivity setting, only large blocks of pixels that change from frame to frame, such as the pixels corresponding to automobile 172 (FIGS. 3 and 4), are included in the image processing for inclusion in a finished product. At a high sensitivity setting, blocks of pixels of small objects, such as leaves (not shown) on tree 164 (FIGS. 3 and 4), are processed as well. There also may be a "bleed" area of an expanded number of pixels beyond the recognized change area compared to the key frame. After a cut is made, a setting may be provided to delete the bleed area prior to pasting the image to the key frame.

During processing associated with a "Note Changes" block 366, process 300 the differences between the current photo and the key photo, as determined during block 346, based upon the defined sensitivity level, are noted so that during a "Save Changes" block 368 the changes can be incorporated into a composite image as described above in conjunction with Drag & Layer block 316 (FIG. 5) of process 300. As explained above in conjunction with FIG. 5, a "bleed" area around the changes may also be saved. A bleed area, is an expanded area around element 209, typically a width of between one (1) and twenty (20) pixels but may be more. The specific size or width of the bleed area may be set with a defined configuration parameter. When the saved, image is finally position onto a key image (see 316, FIG. 5), this bleed area may be either completely or partially removed. Finally, process 360 proceeds to an "End Edit image" block 369 in which process 360 is complete.

Figure 8:
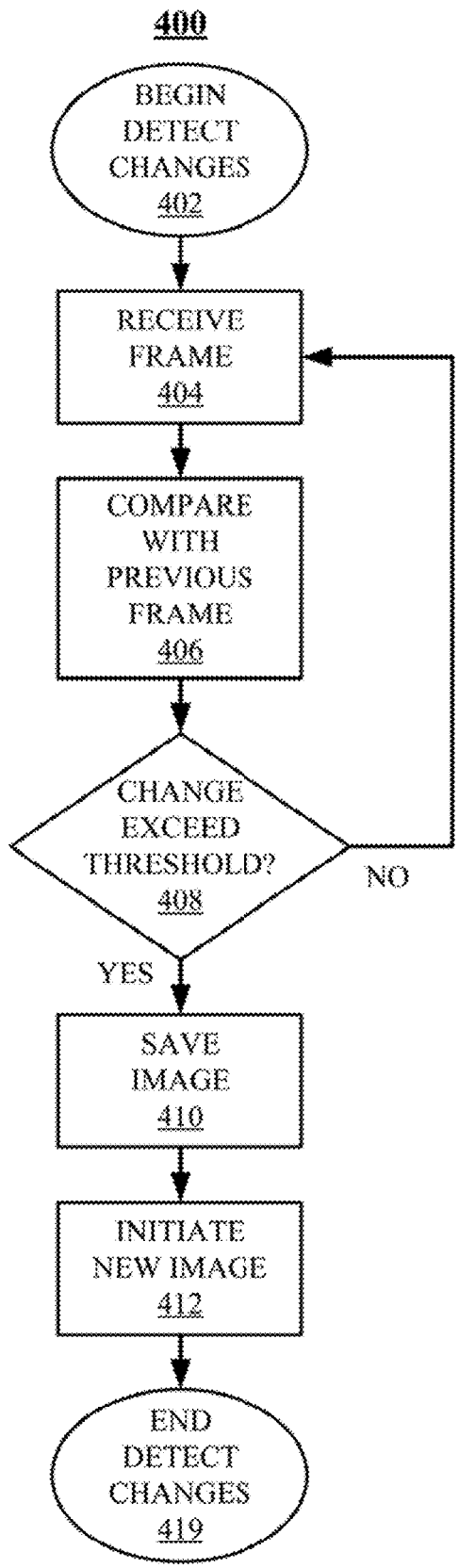
FIG. 8 is a flowchart or a Detect Changes process that may be employed in one embodiment of the claimed technology.

FIG. 8 is a flowchart of a Detect Changes process 400 that may be employed in one embodiment of the claimed technology. In this example, logic associated with process 400 is stored on a memory (not shown) of a processor (not shown) on mobile telephone 103 (FIG. 1). It should be understood that process 400 may be used in conjunction with processes 300 (FIG. 5), 330 (FIG. 6) and 360 (FIG. 7). Process 400, as well as the rest of the disclosed technology, may be implemented as an application on mobile telephone 103 or other computing device.

Process 400 starts in a "Begin Detect Changes" block 402 and proceeds immediately to a "Receive Frame" block 404. During processing associated with block 404, a frame in a series of frames is received. During processing associated with a "Compare With Previous Frame" block 406, the difference between the frame received during processing associated with block 404 and either the previous frame or the key frame, depending upon the configuration, is calculated. As explained above, types of differences that may be detected between images include, but are not limited to, the amount or percent of changed pixel, color or a combination. During processing associated with a "Change Exceed Threshold?" block 408, a determination is made as to whether or not, as a result of the comparison calculated during processing associated with block 406, the difference in frames exceeds a defined parameter. If not, control returns to block 404, a next frame is received and processing continues as described above.

If, during processing associated with block. 408, a determination that the change in frames exceeds the threshold, control proceeds to a "Save Image" block 410. During processing associated with block 410, the key frame and the frames between the key frame and the frame received during processing associated with block 404 are saved as one animation in accordance with the disclosed technology. During processing associated with an "Initiate New Image" block 412, a new key frame is selected and the processes continues as described above in conjunction with FIGS. 5-7. Finally, process 400 proceeds to an "End Detect Changes" block during processing associated with process 400 is complete.

Figure 9:
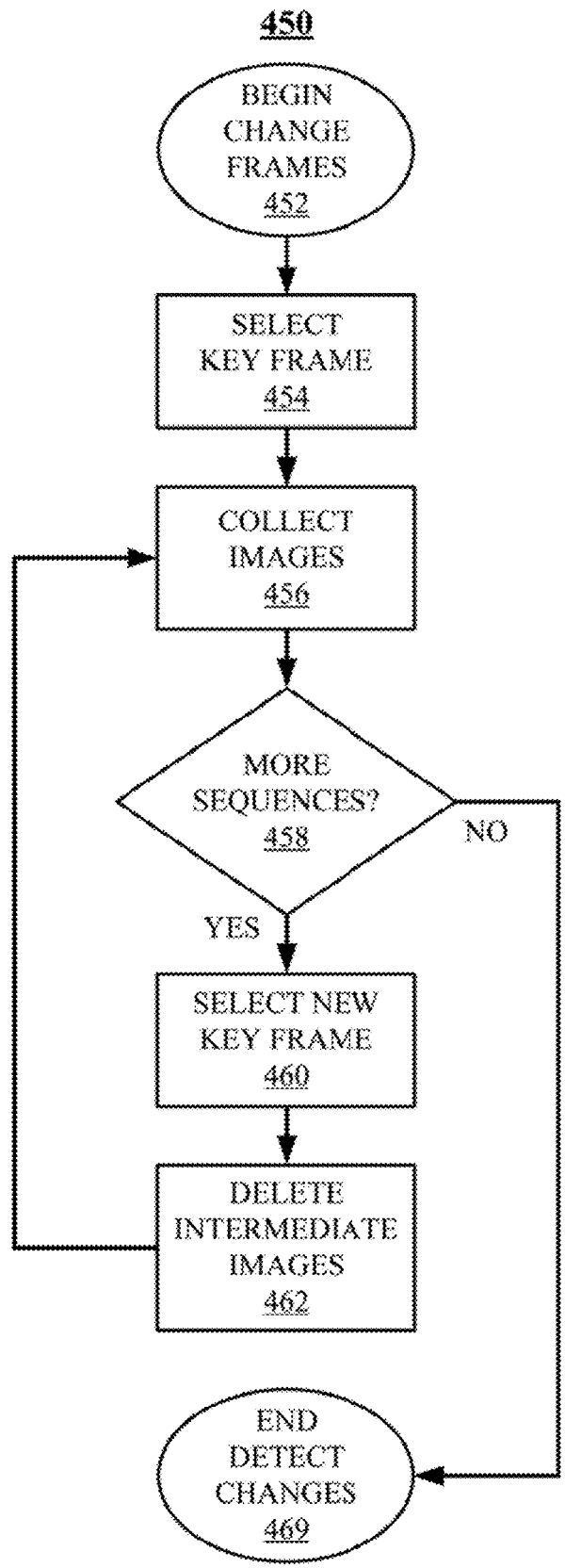
FIG. 9 is a flowchart of a Change Frame process that may implement aspects of the claimed subject matter.

FIG. 9 is a flowchart of a Change Frame process 450 that may implement aspects of the claimed subject matter. In this example, logic associated with process 450 is executed on CPU 104 (FIG. 1) of computer 102 (FIG. 1). Briefly, process 450 enables a user to combine sequences of images so that images captured at a single session may appear to be two or more separate moving images.

Process 450 states in a "Begin Change Frame" block 452 and proceeds to a "Select Key Frame" block 454. During processing associated with block 454, a first frame in a sequence of frames is selected. During processing associated with a "Collect Images" block" subsequent images are collected and processed (see 300, FIG. 5). Once all desired images have been collected, control proceeds to a "More Sequences?" block 458. During processing associated with block 458, a determination is made as to whether or not addition sequences need to be specified. If so, during processing associated with a "Select New Frame" block 460, a new key frame is selected. It should be noted that, the frames between the last image collected during processing associated with block 456 and the selection of another key frame, the user may move the camera or video device collecting the images. During processing associated with a "Delete Intermediate Images" block 462, the images between the frames between the last image collected during processing associated with block 456 and the selection of another key frame are deleted, i.e., not utilized in the final product. If, during processing associated with block 458, a determination is made that no more sequences are necessary, control proceeds to an "End Change Frames" block 469 during which process 450 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

I claim:

1. A method for providing animation in an electronic message, comprising:
    capturing three or more images in a sequential order from a location;
    receiving data indicating a first image of the three or more images;
    designating two or more sequential images of the three or more images that differ from the first image with respect to motion of a user selected element, wherein the motion is detected by comparing the user selected element in the corresponding sequential image with the user selected element in the first image;
    identifying two or more blocks of pixels, each block of the two or more blocks of pixels capturing the motion of the user selected element of a corresponding one of the two or more sequential images;
    cutting the identified two or more blocks of pixels from the corresponding two or more sequential images to produce cut images;
    inserting into the first image the cut images as layers such that each cut image other than a first cut image is layered on a preceding cut image and each cut image is inserted into the first image in a position corresponding to the position of the cut image in the corresponding sequential image; and
    saving the first image and the inserted cut images as a single web-enable graphic image file.

2. The method of claim 1, further comprising capturing a second feature by repeating the method of claim 1.

3. The method of claim 1, further comprising:
    receiving data designating a second image of the plurality of images;
    designating second two or more sequential images of the plurality of images that are subsequent to the second image and differ from the second image with respect to motion of a second user selected element, wherein the motion is detected by comparing the second user selected element in the corresponding sequential image with the second user selected element in the first image;
    identifying a second two or more blocks of pixels, each identified block of the corresponding second two or more blocks of pixels capturing the motion of the second user selected element and corresponding to one of the second identified sequential images;
    cutting the identified second plurality of two or more blocks from the second two or more sequential images to produce second cut images;
    inserting the second cut images onto the second image as layers such that each second cut image is inserted in the second image in a position corresponding to the position of the second cut image in the corresponding second sequential image; and
    saving the second image and the second cut images as a single web-enabled graphic image file.

4. The method of claim 1, wherein the single web-enabled graphic image file is a graphic interchange format (gif) file.

5. The method of claim 1, wherein the method is implemented on a camera.

6. The method of claim 1, wherein the method is implemented on a mobile telephone.

7. The method of claim 1, further comprising displaying the single web-enable graphic image file, wherein each identified cut image is removed from the first image prior to displaying the next cut image in the sequential order.

8. An apparatus for providing animation in an electronic message, comprising:
a processor;
a non-transitory, computer-readable storage medium; and
instructions, stored on the computer-readable storage medium and executed on the processor, for performing a method, the method comprising:
capturing three or more images in a sequential order from a location;
receiving data indicating a first image of the three or more images;
designating two or more sequential images of the three or more images that differ from the first image with respect to motion of a user selected element, wherein the motion is detected by comparing the user selected element in the corresponding sequential image with the user selected element in the first image;
identifying two or more blocks of pixels, each block of the corresponding two or more blocks of pixels capturing the motion of the user selected element of a corresponding one of the two or more sequential images;
cutting the identified two or more blocks of pixels from the two or more sequential images to produce cut images;
inserting into the first image the two or more cut images onto the first image as layers such that each cut image other than a first cut image is layered on a preceding cut image and each cut image is inserted into in the first image in a position corresponding to the position of the cut image in the corresponding sequential image; and
saving the first image and the inserted cut images as a single web-enable graphic image file.

9. The apparatus of claim 8, the method further comprising capturing a second user selected element by repeating the method of claim 8.

10. The apparatus of claim 8, the method further comprising:
receiving data designating a second image of the plurality of images;
designating second two or more sequential images of the plurality of images that are subsequent to the second image and differ from the second image with respect to motion of a second user selected element, wherein the motion is detected by comparing the corresponding sequential image with the first image;
identifying a second two or more blocks of pixels, each identified block of the corresponding second two or more blocks of pixels capturing the motion of the second user selected element of a corresponding one of the second identified sequential images;
cutting the identified second plurality of two or more blocks from the second two or more sequential images to produce second cut images;
inserting the second cut images onto the second image as layers such that each second cut image is inserted in the second image in a position corresponding to the position of the second cut image in the corresponding second sequential image; and
saving the second image and the second cut images as a single web-enabled graphic image file.

11. The apparatus of claim 8, wherein the single web-enabled image graphic file is a graphic interchange format (gif) file.

12. The apparatus of claim 8, wherein the apparatus is a camera.

13. The apparatus of claim 8, wherein the apparatus is a mobile telephone.

14. The apparatus of claim 8, the method further comprising displaying the single web-enable graphic image file, wherein each identified cut image is removed from the first image prior to displaying the next cut image in the sequential order.

15. A method for displaying animation in an electronic message, comprising:
receiving an image, the image generated by a method comprising:
capturing three or more images in a sequential order from a location;
receiving data indicating a first image of the three or more images;
designating two or more sequential images of the three or more images that differ from the first image with respect to motion of a user selected element, wherein the motion is detected by comparing the corresponding sequential image with the first image;
identifying two or more blocks of pixels, each block of the two or more blocks of pixels capturing the motion of the user selected element and corresponding to one of the sequential images;
cutting the identified plurality of blocks from the sequential images to produce cut images; and
inserting into the first image the cut images as layers such that each cut image other than a first cut image is layered on a preceding cut image and each cut image is inserted into the first image in a position corresponding to the position of the cut image in the corresponding sequential image; and
saving the first image and the inserted cut images as a single web-enable graphic image file.

16. The method of generating the image of claim 15, further comprising capturing a second user selected element by repeating the method of claim 15.

17. The method of claim 15, further comprising displaying the single web-enable graphic image file, wherein each identified cut image is removed from the first image prior to displaying the next cut image in the sequential order.

* * * * *